(12) United States Patent
Amundsen

(10) Patent No.: US 8,315,804 B2
(45) Date of Patent: Nov. 20, 2012

(54) METHOD OF AND APPARATUS FOR ANALYZING DATA FROM AN ELECTROMAGNETIC SURVEY

(75) Inventor: Lasse Amundsen, Trondheim (NO)

(73) Assignee: Statoilhydro ASA, Stavanger (NO)

( * ) Notice: Subject to any disclaimer, the term of this patent is extended or adjusted under 35 U.S.C. 154(b) by 466 days.

(21) Appl. No.: 12/522,685

(22) PCT Filed: Jan. 9, 2008

(86) PCT No.: PCT/EP2008/050200
§ 371 (c)(1),
(2), (4) Date: Oct. 29, 2009

(87) PCT Pub. No.: WO2008/084061
PCT Pub. Date: Jul. 17, 2008

(65) Prior Publication Data
US 2010/0057363 A1    Mar. 4, 2010

(30) Foreign Application Priority Data
Jan. 9, 2007  (GB) .................................. 0700280.1

(51) Int. Cl.
*G01V 3/38* (2006.01)

(52) U.S. Cl. .......................................................... 702/5
(58) Field of Classification Search .................. 702/5
See application file for complete search history.

(56) References Cited

U.S. PATENT DOCUMENTS

| | | | |
|---|---|---|---|
| 1,818,331 A | 8/1931 | Jakosky | |
| 2,077,707 A | 4/1937 | Melton | |
| 2,139,460 A | 12/1938 | Potapenko | |
| 2,268,106 A | 12/1941 | Blau | |
| 2,426,918 A | 9/1947 | Barret | |
| 2,531,088 A | 11/1950 | Thompson | |
| 2,766,422 A | 10/1956 | Carbonetto | |
| 2,907,389 A | 10/1959 | Hitzman | |
| 2,919,397 A | 12/1959 | Morley | |
| 2,953,742 A | 9/1960 | Herbold | |
| 3,052,836 A | 9/1962 | Postma | |

(Continued)

FOREIGN PATENT DOCUMENTS
EP        0087271        8/1983
(Continued)

OTHER PUBLICATIONS

Jose L. Bermejo, Geophysical Discovery of a New LNAPL Plume at the Former Wurtsmith AFB, Oscoda, Michigan, Fall 1997 GWMR, pp. 131-137.*
About GSSI—Ground Penetrating Radar Equipment Manufacturer, printed Jan. 10, 2012, 2 pages.*
Ground Penetrating Radar & Geophysical Services, printed Jan. 10, 2012, 5 pages.*
Model 4108 Horn Antenna System Settings and User Notes, Feb. 2002, 7 pages.*

(Continued)

*Primary Examiner* — Tung S Lau
(74) *Attorney, Agent, or Firm* — Patterson Thuente Christensen Pedersen, P.A.

(57) ABSTRACT

A method is provided for analyzing data from an electromagnetic survey of a region so as to indicate the presence of a hydrocarbon reservoir. The survey provides vertical magnetic dipole data and electric dipole data, or provides measurement data from which these dipole data may be determined. The amplitude of the vertical magnetic dipole data is determined, optionally after normalising the data with reference date relating to the same region. Similarly, the amplitude of the electric dipole data is determined, optionally after similarly being normalised. The amplitudes are then compared to provide an indication of the likelihood of the presence of hydrocarbons in the region.

21 Claims, 1 Drawing Sheet

U.S. PATENT DOCUMENTS

| | | |
|---|---|---|
| 3,105,014 A | 9/1963 | Harrison |
| 3,113,316 A | 12/1963 | Berry |
| 3,114,875 A | 12/1963 | Haagensen |
| 3,332,487 A | 7/1967 | Jones |
| 3,398,356 A | 8/1968 | Still |
| 3,548,299 A | 12/1970 | Duroux et al. |
| 3,763,419 A | 10/1973 | Barringer |
| 3,806,795 A | 4/1974 | Morey |
| 3,819,246 A | 6/1974 | List |
| 3,836,960 A | 9/1974 | Gehman et al. |
| 3,959,721 A | 5/1976 | Roschuk et al. |
| 3,990,123 A | 11/1976 | Stachiw et al. |
| 4,010,413 A | 3/1977 | Daniel |
| 4,041,372 A | 8/1977 | Miller et al. |
| 4,047,098 A | 9/1977 | Duroux |
| 4,077,686 A | 3/1978 | Bukaitz |
| 4,079,309 A | 3/1978 | Seeley |
| 4,094,304 A | 6/1978 | Wright, Jr. |
| 4,168,484 A | 9/1979 | Wright, Jr. |
| 4,218,678 A | 8/1980 | Fowler et al. |
| 4,229,809 A | 10/1980 | Schwalbe |
| 4,245,191 A | 1/1981 | Schroeder |
| 4,258,321 A | 3/1981 | Neale, Jr. |
| 4,258,322 A | 3/1981 | Rocroi et al. |
| 4,283,099 A | 8/1981 | Burton |
| 4,296,379 A | 10/1981 | Yoshizumi |
| 4,298,840 A | 11/1981 | Bischoff et al. |
| 4,308,499 A | 12/1981 | Thierbach et al. |
| 4,396,885 A | 8/1983 | Constant |
| 4,417,210 A | 11/1983 | Rocroi et al. |
| 4,446,434 A | 5/1984 | Sternberg et al. |
| 4,451,789 A | 5/1984 | Meador |
| 4,456,067 A | 6/1984 | Pinner |
| 4,489,276 A | 12/1984 | Yu |
| 4,492,924 A | 1/1985 | Nilsson |
| 4,494,805 A | 1/1985 | Washburn |
| 4,500,146 A | 2/1985 | Peterson |
| 4,516,226 A | 5/1985 | Peynaud et al. |
| 4,547,733 A | 10/1985 | Thoraval |
| 4,583,095 A | 4/1986 | Peterson |
| 4,594,551 A | 6/1986 | Cox et al. |
| 4,616,184 A | 10/1986 | Lee et al. |
| 4,617,518 A | 10/1986 | Srnka |
| 4,652,829 A | 3/1987 | Safinya |
| 4,660,645 A | 4/1987 | Newlove |
| 4,677,438 A | 6/1987 | Michiguchi et al. |
| 4,698,791 A | 10/1987 | Cunningham |
| 4,760,340 A | 7/1988 | Denzau et al. |
| 4,791,998 A | 12/1988 | Hempkins et al. |
| 4,793,664 A | 12/1988 | Jackson |
| 4,835,473 A | 5/1989 | Bostick, Jr. |
| 4,835,474 A | 5/1989 | Parra et al. |
| 4,906,575 A | 3/1990 | Silver et al. |
| 4,926,394 A | 5/1990 | Doyen |
| 4,957,172 A | 9/1990 | Patton et al. |
| 4,986,354 A | 1/1991 | Cantu |
| 4,992,995 A | 2/1991 | Favret |
| 5,025,218 A | 6/1991 | Ramstedt |
| 5,032,794 A | 7/1991 | Ridd et al. |
| 5,039,179 A | 8/1991 | Chouzenoux |
| 5,043,667 A | 8/1991 | Schofield |
| 5,066,916 A | 11/1991 | Rau |
| 5,103,920 A | 4/1992 | Patton et al. |
| 5,170,440 A | 12/1992 | Cox |
| 5,172,480 A | 12/1992 | Labuc et al. |
| 5,177,445 A | 1/1993 | Cross |
| 5,185,578 A | 2/1993 | Stolarczykz |
| 5,192,952 A | 3/1993 | Johler |
| 5,219,386 A | 6/1993 | Kletzmaier et al. |
| 5,280,284 A | 1/1994 | Johler |
| 5,357,253 A | 10/1994 | Van Etten et al. |
| 5,369,892 A | 12/1994 | Dhaemers |
| 5,373,443 A | 12/1994 | Lee et al. |
| 5,400,030 A | 3/1995 | Duren et al. |
| D359,403 S | 6/1995 | Tisbo et al. |
| 5,421,646 A | 6/1995 | McNamara et al. |
| D361,446 S | 8/1995 | Acard |
| 5,444,619 A | 8/1995 | Hoskins et al. |
| H1490 H | 9/1995 | Thompson et al. |
| D362,767 S | 10/1995 | Kelly et al. |
| D366,376 S | 1/1996 | Tisbo et al. |
| D366,577 S | 1/1996 | Tisbo et al. |
| 5,486,764 A | 1/1996 | Thompson et al. |
| H1524 H | 4/1996 | Thompson et al. |
| H1561 H | 7/1996 | Thompson |
| 5,563,513 A | 10/1996 | Tasci |
| 5,564,806 A | 10/1996 | Keisling et al. |
| 5,581,024 A | 12/1996 | Meyer, Jr. et al. |
| 5,689,068 A | 11/1997 | Locatelli et al. |
| 5,690,401 A | 11/1997 | Franklin |
| 5,704,142 A | 1/1998 | Stump |
| 5,724,309 A | 3/1998 | Higgs et al. |
| 5,767,679 A | 6/1998 | Schroder |
| 5,770,945 A | 6/1998 | Constable |
| 5,777,478 A | 7/1998 | Jackson |
| 5,798,892 A | 8/1998 | Kobayashi et al. |
| 5,811,973 A | 9/1998 | Meyer, Jr. |
| 5,825,188 A | 10/1998 | Montgomery et al. |
| 5,838,634 A | 11/1998 | Jones |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,894,450 A | 4/1999 | Schmidt et al. |
| 5,901,795 A | 5/1999 | Tsao et al. |
| 5,905,380 A | 5/1999 | Weiner et al. |
| 5,905,657 A | 5/1999 | Celniker |
| 5,940,777 A | 8/1999 | Keskes |
| 5,955,884 A | 9/1999 | Payton et al. |
| 5,987,388 A | 11/1999 | Crawford et al. |
| 5,996,414 A | 12/1999 | Mercado |
| 6,002,357 A | 12/1999 | Redfern et al. |
| 6,005,916 A | 12/1999 | Johnson et al. |
| 6,011,557 A | 1/2000 | Keskes et al. |
| 6,023,168 A | 2/2000 | Minerbo |
| 6,026,913 A | 2/2000 | Mandal et al. |
| 6,041,018 A | 3/2000 | Roche |
| 6,049,760 A | 4/2000 | Scott |
| 6,060,884 A | 5/2000 | Meyer, Jr. et al. |
| 6,060,885 A | 5/2000 | Tabarovsky et al. |
| 6,061,412 A | 5/2000 | Stucker et al. |
| 6,087,833 A | 7/2000 | Jackson |
| 6,101,448 A | 8/2000 | Ikelle et al. |
| 6,108,605 A | 8/2000 | Doyle et al. |
| 6,114,972 A | 9/2000 | Smith |
| 6,140,819 A | 10/2000 | Peterman et al. |
| 6,157,195 A | 12/2000 | Vail, III |
| 6,163,155 A | 12/2000 | Bittar |
| 6,181,138 B1 | 1/2001 | Hagiwara et al. |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,236,211 B1 | 5/2001 | Wynn |
| 6,236,212 B1 | 5/2001 | Wynn |
| 6,246,240 B1 | 6/2001 | Vail, III |
| 6,294,917 B1 | 9/2001 | Nichols |
| 6,339,333 B1 | 1/2002 | Kuo |
| 6,389,360 B1 | 5/2002 | Alft et al. |
| 6,415,231 B1 | 7/2002 | Hebert |
| 6,424,918 B1 | 7/2002 | Jorgensen et al. |
| 6,450,599 B1 | 9/2002 | Mamuyac |
| 6,480,000 B1 | 11/2002 | Kong et al. |
| 6,499,817 B2 | 12/2002 | Jermain |
| 6,573,855 B1 | 6/2003 | Hayakawa et al. |
| 6,628,119 B1 | 9/2003 | Eidesmo et al. |
| 6,662,147 B1 | 12/2003 | Fournier et al. |
| 6,696,839 B2 | 2/2004 | Ellingsrud et al. |
| 6,700,526 B2 | 3/2004 | Witten |
| 6,717,411 B2 | 4/2004 | Ellingsrud et al. |
| 6,826,483 B1 | 11/2004 | Anderson et al. |
| 6,834,732 B2 | 12/2004 | Haarstad |
| 6,842,006 B2 | 1/2005 | Conti et al. |
| 6,859,038 B2 | 2/2005 | Ellingsrud et al. |
| 6,864,684 B2 | 3/2005 | Ellingsrud et al. |
| 6,900,639 B2 | 5/2005 | Ellingsrud et al. |
| 6,917,564 B2 | 7/2005 | Leaney |

| | | | | | | |
|---|---|---|---|---|---|---|
| 6,950,786 B1 | 9/2005 | Sonneland et al. | | GB | 2296567 | 7/1996 |
| 6,950,790 B1 | 9/2005 | Nichols | | GB | 2301902 | 12/1996 |
| 7,026,819 B2 | 4/2006 | Eidesmo et al. | | GB | 2323443 | 9/1998 |
| 7,028,806 B2 | 4/2006 | Dubinsky et al. | | GB | 2333364 | 7/1999 |
| 7,032,707 B2 | 4/2006 | Egerev et al. | | GB | 2355538 | 4/2001 |
| 7,038,456 B2 | 5/2006 | Ellingsrud et al. | | GB | 2382875 | 7/2001 |
| 7,038,850 B2 | 5/2006 | Chang et al. | | GB | 2364390 | 1/2002 |
| 7,042,802 B2 | 5/2006 | Sinha | | GB | 2384068 | 7/2003 |
| 7,072,767 B2 | 7/2006 | Routh et al. | | GB | 2385923 | 9/2003 |
| 7,095,357 B1 | 8/2006 | Johler | | GB | 2390904 | 1/2004 |
| 7,106,065 B1 | 9/2006 | Graf | | GB | 2391946 | 2/2004 |
| 7,123,543 B2 | 10/2006 | Vaage et al. | | GB | 2395563 | 5/2004 |
| 7,126,338 B2 | 10/2006 | MacGregor et al. | | GB | 2399640 | 9/2004 |
| 7,145,341 B2 | 12/2006 | Ellingsrud et al. | | GB | 2404444 | 2/2005 |
| 7,149,672 B2 | 12/2006 | Torkildsen | | GB | 2411006 | 8/2005 |
| 7,202,669 B2 | 4/2007 | Ellingsrud et al. | | GB | 2413187 | 10/2005 |
| 7,319,330 B2 | 1/2008 | Amundsen | | GB | 2413188 | 10/2005 |
| 7,423,432 B2 | 9/2008 | Amundsen | | GB | 2415511 | 12/2005 |
| 7,613,570 B2 | 11/2009 | Rosten et al. | | GB | 2421800 | 7/2006 |
| 7,664,603 B2 | 2/2010 | Rosten | | GB | 2425182 | 10/2006 |
| 7,919,965 B2 | 4/2011 | Schaug-Pettersen et al. | | JP | 2002 244580 | 8/2002 |
| 8,086,426 B2 | 12/2011 | El Ouair et al. | | JP | 2006145360 | 6/2006 |
| 2003/0048105 A1 | 3/2003 | Ellingsrud et al. | | WO | WO 81/01617 | 6/1981 |
| 2003/0050759 A1 | 3/2003 | Srnka et al. | | WO | WO 89/10463 | 11/1989 |
| 2003/0052685 A1 | 3/2003 | Ellingsrud et al. | | WO | WO 90/00749 | 1/1990 |
| 2004/0003511 A1 | 1/2004 | Silver | | WO | WO 92/13172 | 8/1992 |
| 2004/0017137 A1 | 1/2004 | Straub | | WO | WO 92/15771 | 9/1992 |
| 2004/0046568 A1 | 3/2004 | Unsworth et al. | | WO | WO 92/15900 | 9/1992 |
| 2004/0090234 A1 | 5/2004 | Macune | | WO | WO 94/20864 | 9/1994 |
| 2004/0176910 A1 | 9/2004 | Ellingsrud et al. | | WO | WO 96/06367 | 2/1996 |
| 2005/0035696 A1 | 2/2005 | Parise et al. | | WO | WO 96/33426 | 10/1996 |
| 2005/0040742 A1 | 2/2005 | Tsai | | WO | WO 96/35859 | 11/1996 |
| 2005/0264294 A1 | 12/2005 | Constable | | WO | WO 97/33184 | 9/1997 |
| 2006/0005965 A1 | 1/2006 | Chouzenoux et al. | | WO | WO 98/11455 | 3/1998 |
| 2006/0038570 A1 | 2/2006 | Constable | | WO | WO 98/28638 | 7/1998 |
| 2006/0091889 A1 | 5/2006 | Ellingsrud et al. | | WO | WO 99/13966 | 3/1999 |
| 2006/0103387 A1 | 5/2006 | Amundsen | | WO | WO 00/00850 | 1/2000 |
| 2006/0202697 A1 | 9/2006 | Sodal | | WO | WO 00/13037 | 3/2000 |
| 2007/0145980 A1 | 6/2007 | Conti et al. | | WO | WO 00/13046 | 3/2000 |
| 2007/0150201 A1 | 6/2007 | Eidesmo et al. | | WO | WO 00/54075 | 9/2000 |
| 2008/0065330 A1 | 3/2008 | Rosten et al. | | WO | WO 00/63718 | 10/2000 |
| 2008/0189043 A1 | 8/2008 | Anno et al. | | WO | WO 01/20366 | 3/2001 |
| 2008/0195358 A1 | 8/2008 | El Ouair et al. | | WO | WO 01/20366 A1 | 3/2001 |
| 2008/0221795 A1 | 9/2008 | Amundsen et al. | | WO | WO 01/33481 | 5/2001 |
| 2009/0134877 A1 | 5/2009 | Schaug-Pettersen | | WO | WO 01/42818 | 6/2001 |
| 2009/0195251 A1 | 8/2009 | Darnet et al. | | WO | WO 01/55749 | 8/2001 |
| 2009/0243617 A1 | 10/2009 | Farrelly et al. | | WO | WO 01/57555 | 8/2001 |
| 2009/0267608 A1 | 10/2009 | Johnstad et al. | | WO | WO 03/034096 | 4/2003 |
| 2009/0271118 A1 | 10/2009 | Saltzer et al. | | WO | WO 03/036331 | 5/2003 |
| 2010/0045295 A1 | 2/2010 | Mittet et al. | | WO | WO 03/042718 | 5/2003 |
| 2010/0052688 A1 | 3/2010 | Schaug-Pettersen | | WO | WO 03/048737 | 6/2003 |
| 2010/0057363 A1 | 3/2010 | Amundsen | | WO | WO 03/048812 | 6/2003 |
| 2010/0061187 A1 | 3/2010 | Sodal | | WO | WO 03/100467 | 12/2003 |
| | | | | WO | WO 03/104844 | 12/2003 |
| | FOREIGN PATENT DOCUMENTS | | | WO | WO 2004083898 | 9/2004 |
| EP | 0215695 | 3/1987 | | WO | WO 2007/018810 | 2/2007 |
| EP | 0219234 | 4/1987 | | | | |
| EP | 0368762 | 5/1990 | | | | |
| EP | 0512756 | 11/1991 | | | | |
| EP | 0481886 | 4/1992 | | | | |
| EP | 0568612 | 3/1996 | | | | |
| EP | 0814349 | 12/1997 | | | | |
| EP | 1094338 | 4/2001 | | | | |
| EP | 1253437 | 10/2002 | | | | |
| EP | 1253443 | 10/2002 | | | | |
| EP | 1255126 | 11/2002 | | | | |
| EP | 1512033 | 12/2003 | | | | |
| EP | 1309887 | 3/2004 | | | | |
| FR | 2479992 | 10/1981 | | | | |
| FR | 2586302 | 2/1987 | | | | |
| GB | 188676 | 12/1922 | | | | |
| GB | 1342475 | 1/1974 | | | | |
| GB | 1588495 | 4/1981 | | | | |
| GB | 2089043 | 6/1982 | | | | |
| GB | 2197078 | 5/1988 | | | | |
| GB | 2197952 | 6/1988 | | | | |
| GB | 220070 | 12/1989 | | | | |
| GB | 2231602 | 11/1990 | | | | |
| GB | 2256715 | 12/1992 | | | | |

OTHER PUBLICATIONS

Das, Umesh C., "Apparent resistivity curves in controlled-source electro-magnetic sounding directly reflecting true resistivities in a layered earth," *Geophysics*, vol. 60, No. 1, pp. 53-60 (Jan.-Feb. 1995).

"Applications of 3-Dimensional Electromagnetic Induction by Sources in the Ocean", A proposal submitted to MAST III under Area C: Marine Technology, Part 1.

"Applications of 3-Dimensional Electromagnetic Induction by Sources in the Ocean", A proposal submitted to MAST III under Area C: Marine Technology, Part 2.

0119245.9; GB Search Report dated May 28, 2002.

Barton et al., "LITHOS", Cambridge Advanced Lithological Imaging Project Phase 1: 1998-2001 Sub-basalt Imaging, Aug. 21, 1997.

Brevik, "Rock model based inversion of saturation and pressure changes from time lapse seismic data," SEG 1999 Expanded Abstracts (4 pgs.).

Chave et al., "Controlled Electromagnetic Sources for Measuring Electrical Conductivity Beneath the Oceans 1", Forward Problem and Model Study, J. Geophysical Research, vol. 87, No. B7, pp. 5327-5338, Jul. 10, 1982.

Chave et al., "*Some Comments on Seabed Propagation of ULF/ELF Electromagnetic Fields*", 25 Radio Science 825-36 (Sep. 1990).
Cheesman et al., "On the theory of sea-floor conductivity mapping using transient electromagnetic systems", Geophysica, vol. 52. No. 2. Feb. 1987 pp. 204-217.
Constable et al., "Marine controlled-source electomagnetic sounding 2. The PEGASUS experiment" Journal of Geophysical Research. 101.B3 (1996): 5519-5530.
Constable et al., Marine Magnetotellurics for petroleum exploration, Part 1: A sea-floor equipment system. Geophysics 63(3) 816-825. (May-Jun. 1998).
Das.,"Apparent resistivity curves in controlled-source electromagnetic sounding directly reflecting true resistivities in a layered earth" vol. 60, No. 1, pp. 53-60 (Jan.-Feb. 1995).
Edwards et al., "Electromagnetic Assessment of Offshore Methane Hydrate Deposits in the Cascadia Margin", MARELEC 99, 1999.
Edwards et al., "The Assessment of Marine Gas Hydrates through Electrical Remote Sounding: Hydrate without a BSR", Geophysical Research Letters, vol. 27, No. 16, pp. 2397-2400, Aug. 15, 2000.
Edwards, "*On the Resource evaluation of Marine Gas Hydrate Deposits Using Sea-Floor Transient Electric Dipole-Dipole Methods*", 62 Geophysics 63-74 (Jan. 1997).
Eidesmo et al., "Remote detection of hydrocarbon filled layers using marine controlled source electromagnetic sounding," EAGE 64$^{th}$ Conference & Exhibition—Florence, Italy, 4 pages, May 27-30, 2002.
Eidesmo et al., "*Sea Bed Logging (SBL), a new method for remote and direct identification of hydrocarbon filled layers in deepwater areas*", 20 First Break (Mar. 2002).
Ellingsrud et al., "*How Electromagnetic Sounding Technique Could be Coming to Hydrocarbon E & P*", 20 First Break (Mar. 2002).
Ellingsrud et al., "Remote sensing of hydrocarbon layers by seabed logging (SBL): Results from a cruise offshore Angola," The Leading Edge, pp. 972-982, Oct. 2002.
Evans et al, Upper Crustal Resistivity Structure of the East-Pacific Rise Near 13 degrees North, Geophysical Research Letters, vol. 18, No. 10, pp. 1917-1920, Oct. 1991.
Evans et al., "On the Electrical Nature of the Axial Melt Zone at 13 degrees North on the East Pacific Rise", Journal of Geophysical Research, vol. 99, No. B1, pp. 577-588, Jan. 1994.
Evans, Constraints on the Large-Scale Porosity and Permeability Structure of Young Oceanic Crust from Velocity and Resistivity Data, Geophysical Journal International, vol. 119, pp. 869-879, 1994.
Explorations, Scripps Institute of Oceanography, vol. 4, No. 2, 1997.
Flosadottir et al., "Marine Controlled-Source Electromagnetic Sounding 1. Modeling and Experimental Design", Journal of Geophysical Research, vol. 101, No. B3, pp. 5507 to 5517, Mar. 10, 1996.
Garg et al., "*Synthetic Electric Sounding Surveys Over Known Oil Fields*", 49 Geophysics 1959-67 (Nov. 1984).
Greaves et al., New Dimensions of Geophysics for Reservoir Monitoring, pp. 141-150.
Greer et al., "Remote mapping of hydrocarbon extent using marine Active Source EM Sounding," EAGE 65$^{th}$ Conference & Exhibition—Stavanger, Norway, 4 pages, Jun. 2-5, 2003.
Hordt et al., "A First Attempt at Monitoring Underground Gas Storage by Means of Time-lapse Multi-Channel Transient Electromagnetics", Geophysical Prospecting, vol. 48(3), pp. 489-509, 2000.
Hoversten et al., Maring magnetotellurics for petroleum exploration, Part II: numerical analysis of subsalt resolution. Geophysics 63(3): 826-840 (May-Jun. 1998).
International Search Report—PCT/EP2008/050200 dated Nov. 24, 2008.
International Search Report PCT/EP2005/051480 dated Aug. 24, 2005 and Search Report 0407699.8 dated Sep. 9, 2004.
International Search Report for PCT/GB02/05355 dated Mar. 28, 2003.
International Search Report for PCT/2007/003484 dated Dec. 11, 2007 and Search Reports for GB 0618238.0 dated Jan. 8, 2007.
International Preliminary Examination Report for PCT/GB02/05355 dated Dec. 9, 2003.
International Search Report for PCT/EP2005/051483 dated Jul. 28, 2005 and GB 0407697.2 dated Sep. 14, 2004.
International Search Report for PCT/EP2005/051484 dated Aug. 1, 2005 and Search Report from GB 0407696.4 dated Sep. 9, 2004.
International Search Report for PCT/EP2008/050200 dated Nov. 24, 2008.
International Search Report for PCT/GB2004/003267 dated Oct. 13, 2004 and Search Report for GB0317649.2 dated Nov. 10, 2004.
International Search Report for PCT/GB2004/050044 dated Jul. 29, 2005 and Search Report GB0400423.0 dated May 21, 2004.
International Search Report for PCT/GB2005/000282 dated Mar. 14, 2006 and GB 0502064.9 dated May 24, 2005.
International Search Report for PCT/GB2007/003464 dated Apr. 17, 2008 and Search Reports for GB 0618240.6 dated Jan. 22, 2007 and Mar. 22, 2007.
International Search Report for PCT/GB2007/003880 dated Dec. 9, 2008.and Search Reports for GB 0620328.5 dated Jan. 26, 2007 and May 18, 2007.
International Search Report PCT/EP2005/052781 dated Aug. 30, 2005 and Search Report GB0414373.1 dated Oct. 14, 2004.
ISR dated Mar. 5, 2009, Written Opinion, Preliminary Report on Patentability for PCT/GB2007/002138 and Search Report GB 0611497.9 dated Oct. 17, 2007.
Kaufman et al., "Marine Electromagnetic Prosepecting System", 1981 Annual Meeting. Abstracts. 1 page.
Kaufman et al., "*EM Field of an Electric Dipole on the Surface of a Medium Containing a Thin Resistant Layer*", Frequency and Transient Soundings, publ. Elsevier, (1983).
LITHOS Cambridge advanced lithological imaging project. Aug. 21, 1997.
MacGregor et al. "Use of Marine Controlled Source Electromagnetic Sounding for sub-basalt exploration" EAGE 61st conference and Technical Exihibition,Apr. 2008. Finland. Jun. 1999.
MacGregor et al., "Electromagnetic Evidence for a Crustal Melt Accumulation Beneath the Slow Spreading Reykjanes Ridge", Abstract for 13.sup.th Workshop on EM Induction in the Earth.
MacGregor et al., "*Marine Controlled Source Electromagnetic Sounding: Development of a Regularized Inversion for 2-Dimensional Resistivity Structures*", 1 LITHOS Science Report 103-109 (Apr. 1999).
MacGregor et al., "Marine Controlled Source Electromagnetism: Effect of Source-Receiver Geometry on the Response of 1-D models", 1996.
MacGregor et al., "*The RAMESSAS Experiment—III. Controlled-Source Electromagnetic Sounding of the Reykjanes Ridge*", 135 Geophys. J. Int. 773-89 (Jul. 1998).
MacGregor et al., Electrical resistivity structure of the Valu Fa Ridge, Lau Bain, from marine controlled-source electromagnetic sounding, Geophysical Journal International. 146.1 (2001): 217-236.
MacGregor, "Electromagnetic Investigation of the Reykjanes Ridge Near 58° North", PhD Thesis, University of Cambridge.
MacGregor, "Joint analysis of marine active and passive source EM data for sub-salt or sub-basalt imaging," EAGE 65$^{th}$ Conference & Exhibition—Stavanger, Norway, 4 pages, Jun. 2-5, 2003.
Minkoff et al., "Reservoir characterization via time-lapse prestack seismic inversion," 1998 SEG Expanded Abstracts (4 pgs.).
Mittet, R., et al., "Inversion of SBL data acquired in shallow waters," paper presented at EAGE 66th Conference & Exhibition, 5 pgs., (Jun. 6-10, 2004).
Mittet, Rune, et al., On the orientation and absolute phase of marine CSEM receivers, Geophysics, vol. 72 No. 4 pp. F145-F155 (Jul.-Aug. 2007).
Nekut et al., "Petroleum Exploration Using Controlled Source Electromagnetic, Methods", Proceedings of the IEEE, vol. 77(2), pp. 338-362, 1989.
Opderbecke, At-Sea Calibration of a USBL Underwater Vehicle Positioning System, Oceans 97 Conference Proceedings Halifax, NS, Canada, MTS/IEEE vol. 1 pp. 721-726 (Oct. 1997).
Osen et al., Removal of water-layer multiples from multicomponenet sea-bottom data. Geophysics. vol. 64, No. 3. pp. 838-851. May-Jun. 1999.

Peyronnet et al., "POSIDONIA 6000: A New Long Range Highly Accurate Ultra Short Base Line Positioning System" Oceans 98 Conference Proceedings, Nice, France IEEE, vol. 3, pp. 1721-1727 (Sep. 1998).
Preliminary Examination Report—PCT/GB01/03473 mailed Apr. 24, 2002.
Preliminary Examination Report—PCT/GB99/02823 dated Dec. 5, 2000.
Search Report GB 0119245.9 dated May 28, 2002.
Preliminary Examination Report—PCT/GB00/04667 dated Jan. 29, 2002.
Preliminary Examination Report—PCT/GB99/03039 dated Oct. 10, 2000.
Rosten et al., (2003) A Seabed Logging Calibration Survey over the Ormen Lange Gas Field, EAGE, 65th An. Intern. Mtg. Eur.Assoc. Geosc.Eng.Extended Abstracts P058.
Rutledal et al., "Time-Lapse Elastic Inversion at the Oseberg Field," EAGE 64$^{th}$ Conference & Exhibition—Florence Italy May 27-30, 2002 (4 pgs.).
Search Report—PCT/GB00/04667 dated Mar. 9, 2001.
Search Report, GB 0414373.1 dated Oct. 14, 2004 ; Search Report, PCT/EP2005/052781 dated Aug. 30, 2005.
Sinha et al., "*Evidence for Accumulated Melt Beneath the Slow-Spreading Mid-Atlantic Ridge*," 355 Phil. Trans. R. Soc. Lond. A 233-53 (Jan. 1997).
Sinha et al., "An Active Source Electromagnetic Sounding System for Marine Use", Marine Geophysical Researches, 12:59-68, 1990.
Sinha et al., "*Magmatic Processes at Slow Spreading Ridges: Implications of the RAMESSES Experiment at 57 deg. 45'N on the Mid-Atlantic Ridge*," 135 Geophys. J. Int. 731-45 (Jul. 1998).
Sinha et al., "Sub-Sea-Floor Imaging for Structural and Lithological Properties Using Controlled Source Electromagnetic (CSEM) Sounding", Abstract for Technology for Deep-Sea Geological Investigations, Developments, Applications and Results, Nov. 11-12, 1998.
Sinha., "Controlled Source EM sounding: Survey design considerations for hydrocarbon applications" LITHOS Science Report. Apr. 1999: 95-101.
Slob, "Wave field decomposition of full-polarimetric data based on the two-way wave equation," Grounds Penetrating Radar, Proceedings of the 10$^{th}$ Int'l Conference on Delft, The Netherlands, Jun. 21-24, 2004, vol. 1 pp. 315-318 (Jun. 21, 2004).
Spies, "Recent Developments in the use of Surface Electrical Methods for Oil and Gas Exploration in the Soviet Union", Geophysics, vol. 48(8), pp. 1102-1112, 1983.
Strack et al., "Integrating Long-Offset Transient Electromagnetics (LOTEM) with Seismics in an Exploration Environment", Geophysical Prospecting, vol. 44, pp. 997-1017, 1996.
Unsworth et al., "Electromagnetic Induction by a Finite Electric Dipole Source Over a 2-D Earth", Geophysics, vol. 58, pp. 198-214, 1993.
Unsworth, "Electromagnetic Exploration of the Oceanic Crust with Controlled-Sources", Chptr 5, Insight into Induction, PhD Thesis, University of Cambridge, 1991.
Ursin, "Review of elastic and electomagnetic wave propagation in horizontally layered media" Geophysics. vol. 48, No. 8. pp. 1063-1081. Aug. 1983.
Varela et al., "Assessing dynamic reservoir behavior with time-lapse pre-stack 3D seismic data: a sensitivity study based on inversion," EAGE 64$^{th}$ Conference & Exhibition—Florence Italy May 27-30, 2002 (4 pgs.).
Young et al., "Electomagnetic Active Source Sounding Near the East Pacific Rise" Geophysical Research Letters. vol. 8, No. 10. pp. 1043-1046. Oct. 1981.
Yuan et al., "Electromagnetic Assessment of Offshore Methane Hydrate Deposits on the Cascadia Margin, GP22A-08", American Geophysical Union Fall Meeting, San Francisco, 1998.
Yuan et al., "*The Assessment of Marine Gas Hydrates Through Electrical Remote Sounding: Hydrate Without a BSR?*", 27 Geophys. Res. Letts. 204-217 (Aug. 15, 2000).

Application and File History of U.S. Patent No. 6,628,119, issued Sep. 30, 2003, inventor Eidesmo.
Application and File History of U.S. Patent No. 7,026,819, issued Apr. 11, 2006, inventor Eidesmo.
Application and File History of U.S. Appl. No. 11/287,893, filed Nov. 28, 2005, inventor Eidesmo.
Application and File History of U.S. Patent No. 6,696,839, issued Feb. 24, 2004, inventor Ellingsrud.
Application and File History of U.S. Patent No. 6,864,684, issued Mar. 8, 2005, inventor Ellingsrud.
Application and File History of U.S. Appl. No. 11/585,992, filed Oct. 24, 2006, inventor Ellingsrud.
Application and File History of U.S. Appl. No. 11/585,991, filed Oct. 24, 2006, inventor Ellingsrud.
Application and File History of U.S. Patent No. 6,717,411, issued Apr. 6, 2004, inventor Ellingsrud.
Application and File Histroy of U.S. Patent No. 6,900,639, issued May 31, 2005, inventor Ellingsrud.
Application and File History of U.S. Patent No. 7,038,456, issued May 2, 2006. inventor Ellingsrud.
Application and File History of U.S. Patent No. 7,202,669, issued Apr. 10, 2007, inventor Ellingsrud.
Application and File History of U.S. Patent No. 7,423,432, issued Sep. 9, 2008, inventor Amundsen.
Application and File Histroy of U.S. Patent No. 7,319,330, issued Jan. 15, 2008, inventor Ellingsrud.
Application and File History of U.S. Publication No. 2006/0202697, published Sep. 14, 2006, inventor Sodal.
Application and File History of U.S. Publication No. 2009/0134877, published May 28, 2009, inventor Schaug-Pettersen.
Application and File History of U.S. Patent No. 7,126,338, issued Oct. 24, 2006, inventor Eidesmo.
Application and File History of U.S. Publication No. 2007/0150201, published Jun. 28, 2007, inventor Eidesmo.
Application and File History of U.S. Patent No. 6,859,038, issued Feb. 22, 2005, inventor Ellingsrud.
Application and File History of U.S. Patent No. 7,145,341, issued Dec. 5, 2006, inventor Ellingsrud.
Application and File History of U.S. Publication No. 2010/0052688, published Mar. 4, 2010, inventors Schaug-Pettersen.
Application and File History of U.S. Appl. No. 12/304,073, filed Mar. 10, 2009, inventor Ellingsrud.
Application and File History of U.S. Appl. No. 12/441,632, filed Sep. 24, 2009, inventor Mittet.
Application and File History of U.S. Patent No. 6,834,732, issued Dec. 28, 2004, inventor Haarstad.
Application and File History of U.S. Patent No. 7,149,672, issued Dec. 12, 2006, inventor Torkildsen.
Application and File History of U.S. Publication No. 2008/0195358, published Aug. 14, 2008, inventor El Ouair.
Application of U.S. Patent No. 7,613,570, issued Nov. 3, 2009, inventor Rosten.
Application of U.S. Patent No. 7,664,603, issued Feb. 16, 2010, inventor Rosten.
Application and File History of U.S. Pubication No. 2008/0065330, published Mar. 13, 2008, inventor Rosten.
Application and File History of U.S. Publication No. 2008/0221795. Sep. 11, 2008, inventor Amundsen.
Application and File History of U.S. Publication No. 2010/0057363, published Mar. 4, 2010, inventor Amundsen.
Application and File History of U.S. Publication No. 2010/0045295, published Feb. 25, 2010, inventor Mittet.
Application and File History of U.S. Appl. No. 12/443,189, filed Dec. 30, 2009, inventor Ridyard.
Application and File History of U.S. Publication No. 2010/0061187, published Mar. 11, 2010, inventor Sodal.
Application of U.S. Appl. No. 61/298,582, filed Jan. 27, 2010, inventor Perryman.
Application and File History for U.S. Appl. No. 13/015,138 filed Jan. 27, 2011, inventor Perryman et al.

* cited by examiner

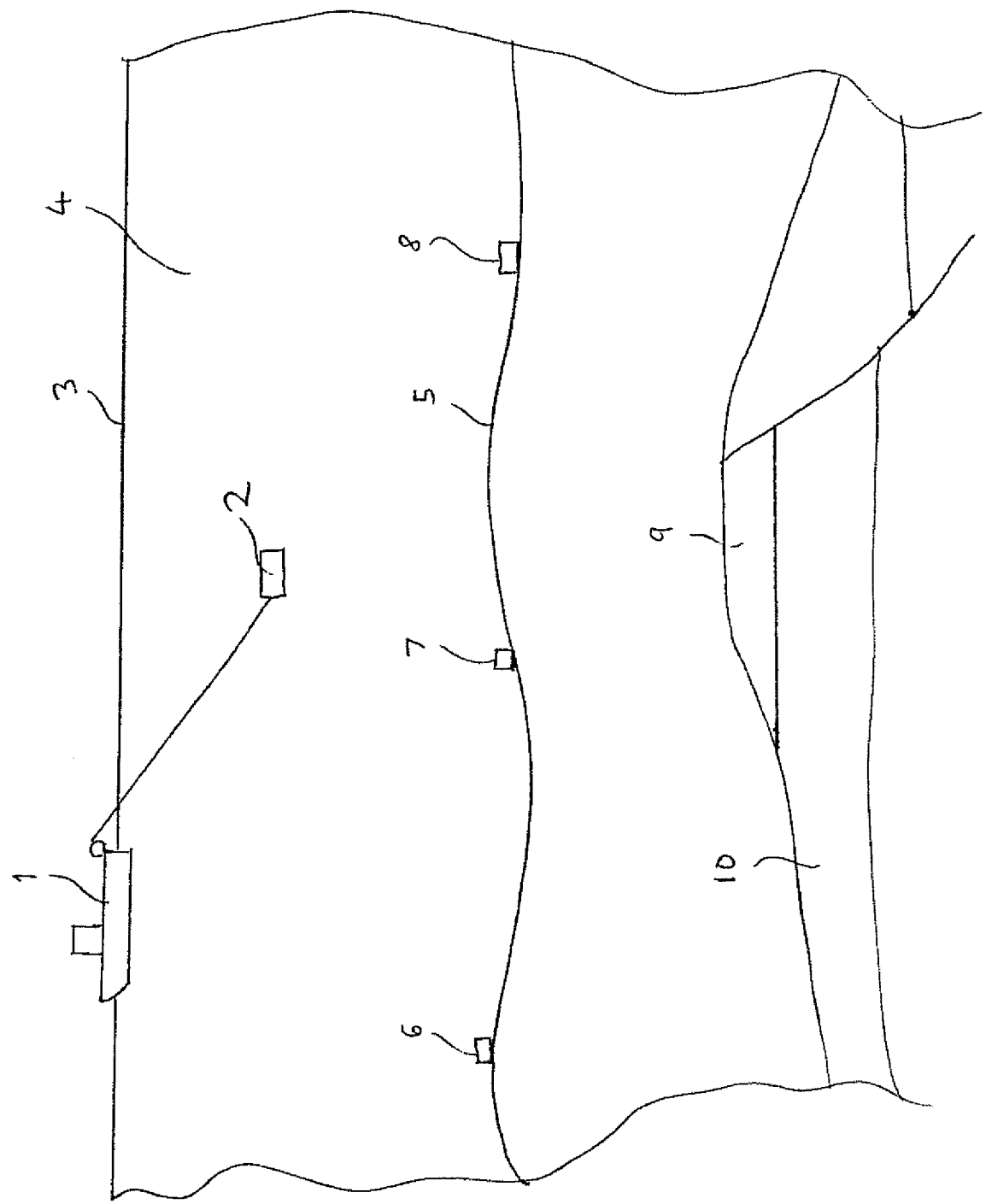

METHOD OF AND APPARATUS FOR ANALYZING DATA FROM AN ELECTROMAGNETIC SURVEY

PRIORITY CLAIM

The present application is a National Phase entry of PCT Application No. PCT/EP2008/050200, filed Jan. 9, 2008, which claims priority from Great Britain Application Number 0700281.0, filed Jan. 9, 2007, the disclosures of which are hereby incorporated by reference herein in their entirety.

TECHNICAL FIELD

The present invention relates to a method of and an apparatus for analyzing data from an electromagnetic survey. Such methods and apparatuses may be used, for example, for land or marine electromagnetic surveying for locating hydrocarbon reservoirs.

BACKGROUND ART

Throughout the specification, the terms "source" and "transmitter" are used interchangeably, as are the terms "receiver," "sensor" and "detector".

Use of marine controlled source electromagnetic (mCSEM) surveying, also referred to as sea bed logging (SBL), for mapping hydrocarbons over shallow prospects in deep water is disclosed in patent specification number GB 01/00419. Further examples of this technique are disclosed by Eidesmo T, S Ellingsurd, L M MacGregor, S Constable, M C Sinha, S Johansen, F N Kong, and H Westerdahl 2002 Sea Bed logging (SBL), "A new method for remote and direct identification of hydrocarbon filled layers in deepwater areas": First Break 20 144-152, and Ellingsrud S, T Eidesmo, S Johansen, M C Sinha, L M MacGregor, and S Constable 2002 "Remote sensing of hydrocarbon layers by sea bed logging (SBL); Results from a cruise offshore Angola": The Leading Edge 21 972-982.

GB 2 390 904 discloses an electromagnetic surveying technique using a vertical electric dipole and a vertical magnetic dipole or naturally occurring electromagnetic fields.

Another known type of electromagnetic surveying technique is known as the multi-transient electromagnetic (MTEM) method and an example of this is disclosed in U.S. Pat. No. 6,914,433.

The mCSEM/SBL technique is based on the fact that hydrocarbons in a subsurface are significantly more resistive to electromagnetic waves than non-hydrocarbon-bearing layers, such as shale or sandstone containing saltwater. The resistivity of shale is in the range of 0.5-3 $\Omega$m and that of water-filled sandstone is around 1 $\Omega$m, whereas that of hydrocarbon-filled sandstone is in the range 5-200 $\Omega$m. Hydrocarbons may therefore be detected by transmitting electromagnetic fields into the subsurface and recording the returning signal at a range of distances or "offsets" from a source. Such an electromagnetic surveying technique is sensitive to the types of fluid in the rock.

A mCSEM/SBL survey typically emits electromagnetic signals close to the sea bed from a powerful electric source. This is generally a horizontal electric dipole (HED) transmitter driven by a low frequency alternating current (AC) of quasi-square waveform. The first several harmonics may be processed so as to increase the bandwidth.

In a typical mCSEM/SBL survey, one or more receivers are deployed along a line on the sea bed or across a section of the sea bed using high-symmetry or irregular receiver grids. Each of the receivers includes an instrument package, a detector, a flotation device and a ballast weight. The detector may comprise, for example, a three component electric dipole detector set and a three component magnetic dipolar detector set. In each of these sets, two dipole detectors are oriented in the horizontal plane as an orthogonal pair and the third dipole detector is oriented in the vertical direction.

Once the survey has been completed and the data collected, the receivers may be retrieved. A telemetric signal from the survey ship prompts each receiver to detach itself from its ballast weight and float to the surface by means of the flotation device, which typically comprises a top-mounted buoyancy system. The receiver position is monitored by a hydro acoustic tracking system. Once the raw data have been downloaded to a computer, they are collated and processed for subsequent data interpretation. The end product is typically an electromagnetic map of the surveyed area, in which hydrocarbon-bearing layers can be distinguished from other layers.

The three major pathways for propagation of an mCSEM/SBL signal are through the sea water, through the subsurface, and through the air. The direct field through the sea water is the signal which is transmitted directly from, for example, an electric dipole source to a receiver. This field dominates in amplitude at short source-receiver separations or offsets but is strongly damped at larger offsets due to a combination of geometrical spreading associated with the source dipole geometry and skin-effect-related exponential attenuation.

The signal that travels partly through air is called the source-induced "airwave". The airwave is dominated by the signal component that diffuses upwards from the source to the sea surface, then propagates through the air at the speed of light with no attenuation, before diffusing back down through the seawater column to the sea bottom where it is picked up by the receivers.

The subsurface structures are, in general, more resistive than the sea water. As a result, skin depths in the subsurface are larger than those in sea water so that the electromagnetic fields propagating in the subsurface before returning to the seabed at intermediate to long offsets are less attenuated than the direct field.

A hydrocarbon-filled reservoir has relatively high resistivity compared with shales and water-filled sandstones of the subsurface. The field of main interest for hydrocarbon mapping is related to the energy propagating downwards from the source into the subsurface and then interacting with the resistive reservoir before returning upwards at intermediate to large offsets. Thus, the electric fields at the receivers should be larger in magnitude over resistive subsurface structures such as hydrocarbon reservoirs than the more-attenuated background electromagnetic fields caused by host sediments. This is related to the lower attenuation experienced by the component of the electromagnetic signal that travels along the higher resistivity hydrocarbon filled reservoir. Thus, when an electromagnetic field propagates over a long distance in hydrocarbon reservoirs, the amplitude of the detected signals dominate those signals which have propagated in the water-bearing sediments. This "enhancement" in electric field amplitude at long source-receiver separations (compared to the depth of the reservoir) allows hydrocarbon reservoirs to be detected.

It is known, however, that an increase in electromagnetic field amplitude need not solely be related to the presence of hydrocarbons. Also, local large-scale resistive bodies other than hydrocarbon reservoirs beneath the seabed can significantly affect the electromagnetic fields due to longer skin depths with increasing resistivity. Increasing resistivity structures with depth are a feature of some submarine sedimentary basins and are known to arise due to the progressive explusion of conductive pore fluids with increasing depth by rising overburden pressure. Accordingly, in order to determine reliably whether an enhancement in electric field amplitude is caused by a subsurface hydrocarbon reservoir or whether it is caused by local large-scale resistive structures, independent information about the large background structures in the survey area is needed.

SUMMARY OF THE INVENTION

According to a first aspect of the invention, there is provided a method as defined in the appended claim 1.

Other aspects and embodiments of the invention are defined in the other appended claims.

It is thus possible to provide an improved technique for analyzing data from an electromagnetic survey so as to provide improved detection of hydrocarbons. This technique may be applied to electromagnetic survey data in respect of any type of surveyed region.

BRIEF DESCRIPTION OF THE DRAWING

The invention will be further described, by way of example, with reference to the accompanying drawing, which is a diagram illustrating schematically an example of an electromagnetic surveying technique.

FIG. 1 illustrates a typical example of an electromagnetic surveying technique. Although such a technique may be employed for land or marine CSEM/SBL surveying or land or marine MTEM surveying, the illustrated example is for Mcsem/SBL surveying.

DETAILED DESCRIPTION

A survey ship 1 is shown towing a controlled continuous signal source 2, for example of the type used in frequency-domain marine electromagnetic surveying. However, the source used in electromagnetic surveying may be of any electric or magnetic type and a transient signature source may, for example, be used in multi-transient land or marine electromagnetic surveying. The ship 1 is shown at the surface 3 of the sea and the source 2 is towed through the water column 4 between the sea surface 3 and the sea bed 5 above a region being surveyed. However, the source 2 need not be deployed in the water column 4 or on the sea bed 5. For example, the source 2 may be deployed anywhere in the subsurface below the sea bed 5. In the case of a land survey, for example, the or each source may be disposed in a borehole or well. The source 2 is typically a horizontal electric dipole (HED) source but other sources which may be used comprise vertical electric dipole (VED) sources, horizontal magnetic dipole (HMD) sources, vertical magnetic dipole (VMD) sources, or combinations of such sources.

Purely by way of example, the illustrated subsurface rock formation includes a hydrocarbon reservoir 9 above a layer 10 containing water. As described hereinafter, the data obtained from the illustrated surveying arrangement may be processed to provide detection of the hydrocarbon reservoir 9.

Receivers 6-8, only three of which are illustrated in the drawing, are disposed in any desired arrangement on the sea bed 5. For example, a line survey geometry may be used with the receivers being regularly spaced along a straight line (in plan view) on the sea bed 5. Each of the receivers comprises an instrument packet and an antenna. The antenna may comprise two mutually orthogonal horizontal electric dipole detectors, a vertical electric dipole detector, two mutually orthogonal horizontal magnetic dipole detectors, and a vertical magnetic dipole detector. In other examples, the antenna comprises: two mutually orthogonal horizontal electric dipole detectors and a vertical magnetic dipole detector; a vertical electric dipole detector and a vertical magnetic dipole detector; two mutually orthogonal horizontal magnetic dipole detectors and a vertical magnetic dipole detector. Any current data acquisition system can be used to collect the specific data.

In electromagnetic data analysis for hydrocarbon-filled reservoirs, it is common practice to compare data acquired above the reservoir identified potentially to contain hydrocarbons with reference data which are not sensitive to the postulated hydrocarbon reservoir, but otherwise specific to the area being surveyed. This data analysis step is called normalisation. The reference data can be obtained in several ways. One way is to acquire mCSEM/SBL reference data in the vicinity but outside the location of the postulated reservoir, which can be mapped for instance from seismic data. Another way is to provide reference data by magnetotelluric surveying, or from direct geophysical measurement. Another way is to simulate reference data in a computer using a non-hydrocarbon rock formation model with a body of water above specific to all the survey area. The normalisation step can be applied as a function of survey position to any of the collected electric and magnetic dipole response data.

Current electromagnetic data analysis and interpretation is based on the amplitude and phase information contained in the electric dipole response data. If there is no marked enhancement in the normalised electric dipole amplitude above a reservoir that has been identified potentially to contain hydrocarbons compared with the normalised electric dipole amplitude outside the postulated reservoir, the expert geophysicist interprets this information as indicating a low probability of finding hydrocarbons in the reservoir. On the other hand, a marked enhancement in the normalised electric dipole amplitude above the postulated reservoir compared to the normalised electric dipole amplitude outside the reservoir is interpreted by the expert geophysicist to represent a direct hydrocarbon indicator. However, in practice the enhanced response in the electric dipole measurement need not necessarily indicate a subsurface hydrocarbon reservoir. The response can also be caused by geological features relating to local larger-scale resistive structures, to layers with increasing resistivity with depth, or to layers with resistivity anisotropy. Thus, the single analysis of the horizontal electric dipole response or the vertical electric dipole response has an inherent ambiguity.

The ambiguity is resolved when the amplitude information contained in the vertical component of the magnetic field measured by the vertical magnetic dipole sensor is combined or compared with the amplitude information from the electric dipole measurement. From Maxwell's equations, it follows that the vertical magnetic dipole responds insignificantly to hydrocarbon-presence in the sub-surface due to its insensitivity to galvanically coupled modes induced by the horizontal electric dipole transmitter. On the other hand, the vertical magnetic dipole is sensitive to most inductively coupled modes and so detects the larger scale-resistive structures. Therefore, a combined, concurrent analysis of the individual electric dipole and vertical magnetic dipole components unequivocally solves the ambiguity as to whether an enhanced in electric dipole response is related to resistive hydrocarbon-filled reservoirs or to local large-scale resistive non-hydrocarbon-filled structures. An enhancement electric dipole response measured together with an unchanged, small vertical magnetic dipole response is indicative of the likely presence of a subsurface hydrocarbon-filled reservoir. The variation in amplitude enhancement as a function of source-receiver separation provides information on the depth and extent of the buried hydrocarbon reservoir. Enhanced magnitude responses of both the electric dipole and vertical magnetic dipole components, on the other hand, indicate local large-scale resistive subsurface bodies that are not necessarily hydrocarbon-filled.

For shallow-water electromagnetic surveying where the airwave is known to have a degrading effect on the horizontal electric dipole measurements, but not on the vertical electric dipole measurements, the combined, concurrent analysis may be based on the analysis of the vertical electric dipole measurement together with the vertical magnetic dipole measurement. Alternatively, the airwave can be attenuated or eliminated from the field recordings by up/down decomposition as described in GB2385923 and WO 2005/0906021 or by TM mode decomposition as described in our copending application(s) based on British patent application no. 0617517.8.

In mCSEM/SBL surveying it is common to introduce cylindrical (polar) coordinates to describe the relative source-receiver positions. When the center of the source is at the orgin, the position of the receiver can be described by distance r and azimuth Ø. For the horizontal electric dipole transmitter, the angle Ø is measured clockwise from a line passing through, and running parallel to, the horizontal electric dipole transmitter axis. A receiver placed with azimuthal angle Ø=0 degree is referred to as being in an inline position. A receiver with an azimuthal angle of Ø=90 degrees is referred to as being in a broadside position. In cylindrical coordinates the electromagnetic fields comprise radial and azimuthal components of the electric field and the magnetic field measured at the detector. The present method of analysis is equally valid when the radial electric dipole or radial magnetic dipole components are combined with the vertical magnetic dipole measurement.

Although a vertically oriented electric dipole antenna may be used to provide the vertical electric dipole data, other techniques may be used. For example, Maxwell's equations state the vertical component of the electric field, $E_3$ is related to the two horizontal magnetic field gradients $H_{1,2}$ and $H_{2,1}$ as:

$$E_3 = (i\omega\tilde{\epsilon})^{-1}(H_{1,2} - H_{2,1}) \quad (1)$$

where
$\tilde{\epsilon}$ is the complex permittivity;

$$H_{1,2} = \frac{\partial H_1}{\partial x_1}; \text{ and}$$

$$H_{2,1} = \frac{\partial H_2}{\partial x_1}.$$

The gradients of the magnetic fields may be measured by the use of electromagnetic gradiometers. As an alternative, the gradients may be approximated, for example by dividing the difference between magnetic field measurements at different locations by the distance between the locations. Thus, processing may be based on data obtained solely by measuring the gradients of the two horizontal magnetic field components along with the vertical magnetic component.

As another alternative, processing may use measurement of the vertical electric dipole data $H_3$ and measurements (or calculations) of the gradients $E_{1,2}$, $E_{2,1}$ of the two horizontal electric fields. Maxwell's equations state that the vertical component of the magnetic field, $H_3$, is related to the two horizontal electric field gradients as $$H_3 = -(i\omega\mu)^{-1}(E_{1,2} - E_{2,1}) \quad (2)$$

where:
i is $\sqrt{-1}$;
ω is the angular frequency;
μ is the permeability;

$$E_{2,1} = \frac{\partial E_2}{\partial x_1}; \text{ and}$$

$$E_{1,2} = \frac{\partial E_1}{\partial x_2}.$$

The vertical component of the magnetic field may thus be estimated from the measurements of the horizontal gradients of the electric field.

The data can be further analysed using standard techniques, for example, electromagnetic inversion or migration, to produce subsurface resistivity maps of the area being surveyed.

The present technique is equally applicable to the surveying of freshwater, for example large lakes or estuaries, so that reference to seabed, water-column etc should not be regarded as limiting and should be interpreted as covering lakebed, riverbed etc.

The invention claimed is:

1. A method comprising:
analyzing data from an electromagnetic survey of a region by:
obtaining measurements of vertical magnetic dipole data and separate measurements of electric dipole data from the survey;
utilizing a computer to determine an amplitude of the vertical magnetic dipole data and an amplitude of the electric dipole data; and
utilizing a computer to compare the amplitudes to provide an indication of a likelihood of a presence of hydrocarbons in the region.

2. The method of claim 1, wherein the vertical magnetic data and the electric dipole data are obtained from data detected at a receiver location remote from a source location.

3. The method of claim 1, wherein the vertical magnetic dipole data and the electric dipole data are responsive to a common source.

4. The method of claim 1, further comprising determining the amplitudes for substantially simultaneous vertical magnetic dipole data and electric dipole data.

5. The method of claim 1, further comprising determining the amplitudes for vertical magnetic dipole data and electric dipole data in a same part of the region.

6. The method of claim 1, wherein the step of determining the amplitudes comprises obtaining reference data relating to the region, normalising the vertical magnetic dipole data and the electric dipole data, and deriving the amplitudes of the normalised data.

7. The method of claim 1, wherein the electric dipole data comprises horizontal electric dipole data.

8. The method of claim 1, wherein the electric dipole data comprises radial electric dipole data.

9. The method of claim 1, wherein the electric dipole data comprises vertical electric dipole data.

10. The method of claim 1, wherein the vertical magnetic dipole data are derived from at least one horizontal electric field gradient.

11. The method of claim 1, further comprising indicating an increased likelihood in response to an enhanced electric dipole response and an unenhanced vertical magnetic dipole response.

12. The method of claim 1, wherein the measurements of vertical magnetic dipole data and measurements of electric dipole data are generated from a single electric or magnetic dipole source.

13. The method of claim 3, wherein the common source comprises at least one of a horizontal electric dipole source, a vertical electric dipole source, a horizontal magnetic dipole source and a vertical magnetic dipole source.

14. The method of claim 5, further comprising determining the amplitudes for vertical magnetic dipole data and electric dipole data at substantially a same position in the region.

15. The method of claim 9, wherein the vertical electric dipole data are derived from at least one horizontal magnetic field gradient.

16. A computer program embedded in a non-transitory computer-readable medium containing computer instructions stored therein for causing a computer to perform a method comprising:
  analyzing data from an electromagnetic survey of a region by:
    obtaining vertical magnetic dipole data and separate electric dipole data from the survey;
    utilizing a computer to determine an amplitude of the vertical magnetic dipole data and an amplitude of the electric dipole data; and
    utilizing a computer to compare the amplitudes to provide an indication of a likelihood of a presence of hydrocarbons in the region.

17. A non-transitory computer readable medium comprising computer instructions for causing at least one computer processor to perform a method of analyzing data from an electromagnetic survey of a region, the method comprising:
  analyzing vertical magnetic dipole data and separate electric dipole data obtained from the survey;
  determining an amplitude of the vertical magnetic dipole data and an amplitude of the electric dipole data; and
  comparing the amplitudes to provide an indication of a likelihood of a presence of hydrocarbons in the region.

18. A method of analyzing data from an electromagnetic survey of a region, the method comprising:
  receiving a computer program transmitted across a communications network, the computer program embodied on a non-transitory computer-readable medium for controlling a computer processor to perform a method of analyzing data from an electromagnetic survey of a region, the method comprising:
    analyzing vertical magnetic dipole data and separate electric dipole data obtained from the survey;
    determining an amplitude of the vertical magnetic dipole data and an amplitude of the electric dipole data; and
    comparing the amplitudes to provide an indication of a likelihood of a presence of hydrocarbons in the region.

19. A computer programmed by a computer program embodied on a non-transitory computer-readable medium containing computer instructions for controlling the computer to perform a method of analyzing data from an electromagnetic survey of a region, the method comprising:
  analyzing vertical magnetic dipole data and separate electric dipole data obtained from the survey;
  determining an amplitude of the vertical magnetic dipole data and an amplitude of the electric dipole data; and
  comparing the amplitudes to provide an indication of a likelihood of a presence of hydrocarbons in the region.

20. An apparatus for analyzing data from an electromagnetic survey of a region, the apparatus comprising:
  means for obtaining vertical magnetic dipole data and separate electric dipole data;
  means for determining an amplitude of the vertical magnetic dipole data and an amplitude of the electric dipole data; and
  means for comparing the amplitudes to provide an indication of a likelihood of a presence of hydrocarbons in the region.

21. The apparatus of claim 20, wherein the means for obtaining vertical magnetic dipole data and electric dipole data obtains the data from a single electric or magnetic dipole source.

* * * * *